United States Patent
Brobston et al.

(10) Patent No.: US 7,558,550 B2
(45) Date of Patent: Jul. 7, 2009

(54) VERSATILE SYSTEM FOR MULTIMODE, WIRELESS COMMUNICATION RECEIVER WITH ZIF AND NEAR-ZIF OPERATIONS

(75) Inventors: Michael L. Brobston, Allen, TX (US); Steven Loh, Plano, TX (US); Seong Eun Kim, Plano, TX (US); Weon Ki Yoon, Hillsboro, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 11/326,124

(22) Filed: Jan. 5, 2006

(65) Prior Publication Data

US 2006/0205376 A1      Sep. 14, 2006

Related U.S. Application Data

(60) Provisional application No. 60/653,780, filed on Feb. 17, 2005.

(51) Int. Cl.
   *H04B 1/16* (2006.01)
(52) U.S. Cl. .................. 455/232.1; 455/324; 455/296
(58) Field of Classification Search .............. None
   See application file for complete search history.

(56) References Cited

U.S. PATENT DOCUMENTS

| 4,888,557 A * | 12/1989 | Puckette et al. ............. 455/205 |
| 7,203,476 B2 * | 4/2007 | Ruelke et al. ............... 455/324 |
| 2002/0151289 A1 * | 10/2002 | Rahman et al. .......... 455/232.1 |

* cited by examiner

*Primary Examiner*—Thanh C Le

(57) ABSTRACT

An architecture for a receiver component in a wireless communications system is disclosed—one that supports both zero intermediate frequency (ZIF) and near-zero intermediate frequency (NZIF) operation. The architecture provides a down-conversion segment, and a local oscillator segment operatively associated with the down-conversion segment. An analog-to-digital conversion (ADC) segment is adapted to receive signals from the down-conversion segment and introduce the signals into a digital intermediate frequency (DIF) construct. The DIF construct performs a DC offset compensation or DC residue filtering on NZIF-based signals, and droop or mismatch compensation. Image removal is performed on NZIF-based signals, and DC offset compensation is performed on ZIF-based signals. Compensated signals are amplified to some nominal or desired level, and interpolation filtering of the amplified signals is performed prior to transmission thereof.

19 Claims, 2 Drawing Sheets

VERSATILE SYSTEM FOR MULTIMODE, WIRELESS COMMUNICATION RECEIVER WITH ZIF AND NEAR-ZIF OPERATIONS

CROSS-REFERENCE TO RELATED APPLICATION AND CLAIM OF PRIORITY

The present application is related to U.S. Provisional Patent No. 60/653,780, filed Feb. 17, 2005, entitled "Mobile Terminal Multi-Mode Common Core Receiver with Configurable Direct Downconversion and Near-ZIF Architecture". U.S. Provisional Patent No. 60/653,780 is assigned to the assignee of the present application and is hereby incorporated by reference into the present disclosure as if fully set forth herein. The present application hereby claims priority under 35 U.S.C. §119(e) to U.S. Provisional Patent No. 60/653,780.

TECHNICAL FIELD OF THE INVENTION

The present application relates generally to the field of wireless communications technologies and, more particularly, to apparatus and methods for providing a single receiver that supports both zero intermediate frequency (ZIF) and Near-ZIF operational modes.

BACKGROUND OF THE INVENTION

Increasing demand for more powerful and convenient data and information communication has spawned a number of advancements in communications technologies, particularly in wireless communication technologies. A number of technologies have been developed to provide the convenience of wireless communication in a variety of applications, in various locations. This proliferation of wireless communication has given rise to a number of manufacturing and operational considerations.

There are an increasing number of fixed and portable wireless applications that require, or can benefit from, operation in accordance with a plurality of communications standards or operational protocols. This is commonly referred to as multi-mode operation. Multi-mode capabilities in wireless communication products allow end-users to purchase a single product that may be used in a variety of locations for reasonable length of time—despite any proliferation of or changes in new technologies or standards. Multi-mode capabilities across wireless networks allow providers to offer new, advanced services to a broader range of customers, while fulfilling the needs of their legacy customer base. Thus, wireless base stations and mobile devices need to support portions of emerging standards, as well as revenue producing existing standards for backward compatibility.

Although multi-mode support can be very desirable, it also presents a number of challenges when designing a multimode product—particularly when attempting to address the needs of disparate or competing communications standards or technologies. Commonly, the particular standard or technology associated with each "mode" of a multi-mode device requires substantially unique componentry or circuitry. As such, wireless system designers very rarely—if ever—provide a truly universal, single multi-mode device. Usually, conventional multi-mode systems comprise several devices—each designed to address one particular communications standard or technology—that are packaged together as a single multi-mode product.

Consider, for example, two such technologies which are continuously growing in usage and deployment and, as such, are increasingly targeted for inclusion in multi-mode devices. Wideband Code Division Multiple Access (WCDMA) is a third-generation (3G), wideband, spread-spectrum mobile telecommunication air interface that utilizes code division multiple access multiplexing (CDMA). GSM (Global System for Mobile communications) is currently one of the most popular standards for mobile phones in the world. Although GSM continues to evolve, it is widely regarded as a narrowband, second generation (2G) technology. Various improvements nonetheless seek to keep GSM viable—such as higher speed data transmission introduced with Enhanced Data rates for GSM Evolution (EDGE) technolgoy.

WCDMA has a much more complex physical layer structure and operation than GSM—due, at least in part, to its much wider signal band. Along with additional complexity come a number of additional specifications and requirements. For example, WCDMA systems commonly utilize a ZIF (zero intermediate frequency) based architecture—due to their wideband operation—whereas GSM systems typically rely upon near-ZIF (NZIF) architectures compatible with their relatively narrow band operations.

In order to design a multi-mode product that conforms to both architecture and operational schemes, conventional devices and systems usually combine many different components and modules, each targeted to support operation and processing in either a ZIF or NZIF protocol. Most such conventional components and modules are designed to function only in one operational context—either the wideband (ZIF) or the narrow band (NZIF)—not in both. As a result, a large number of inefficiencies are introduced to the production and operation of conventional multi-mode devices, which increase device and system costs and introduce a greater potential for system reliability and performance problems.

As a result, there is a need for a system that provides a single receiver or transceiver architecture that efficiently supports both wideband and narrow band operational modes (i.e., ZIF and NZIF)—obviating the need for multiple, specialized components within a single multi-mode device—while providing efficient and dependable wireless communications, in an easy and cost-effective manner.

SUMMARY OF THE INVENTION

A versatile system, comprising various apparatus and methods, is provided for a single receiver or transceiver architecture that efficiently supports both wideband and narrow band operational modes—particularly ZIF and near-ZIF (NZIF). The system of the present disclosure provides a reconfigurable digital IF (DIF) construct, within a multi-mode receiver architecture. The DIF construct provides an optimal receiver down conversion technique for operations in a given mode. The system of the present disclosure provides for the optimization of performance for various modes, while at the same time easing receiver processing functions. The system of the present disclosure thus provides a single, common-core receiver that performs equivalent to multiple, dedicated receivers, with no compromise in signal processing quality.

Specifically, an architecture for a receiver component in a wireless communications system is disclosed—one that supports both zero intermediate frequency (ZIF) and near-zero intermediate frequency (NZIF) operation. The architecture provides a down-conversion segment, and a local oscillator segment operatively associated with the down-conversion segment. An analog-to-digital conversion (ADC) segment is adapted to receive signals from the down-conversion segment and introduce the signals into a digital intermediate frequency (DIF) construct. The DIF construct performs DC offset compensation or DC residue filtering on NZIF-based signals—as well as droop or mismatch compensation. Image filtering is performed on NZIF-based signals, and DC offset compensation is performed on ZIF-based signals. Compensated signals are amplified to some nominal or desired level, and interpolation filtering of the amplified signals is performed prior to transmission thereof.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "construct", "element" or "component" mean any device, system or part thereof that control or perform at least one operation, and may be implemented in hardware, firmware or software, or some combination of at least two of the same. It should be noted that the functionality associated with any particular construct or element may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
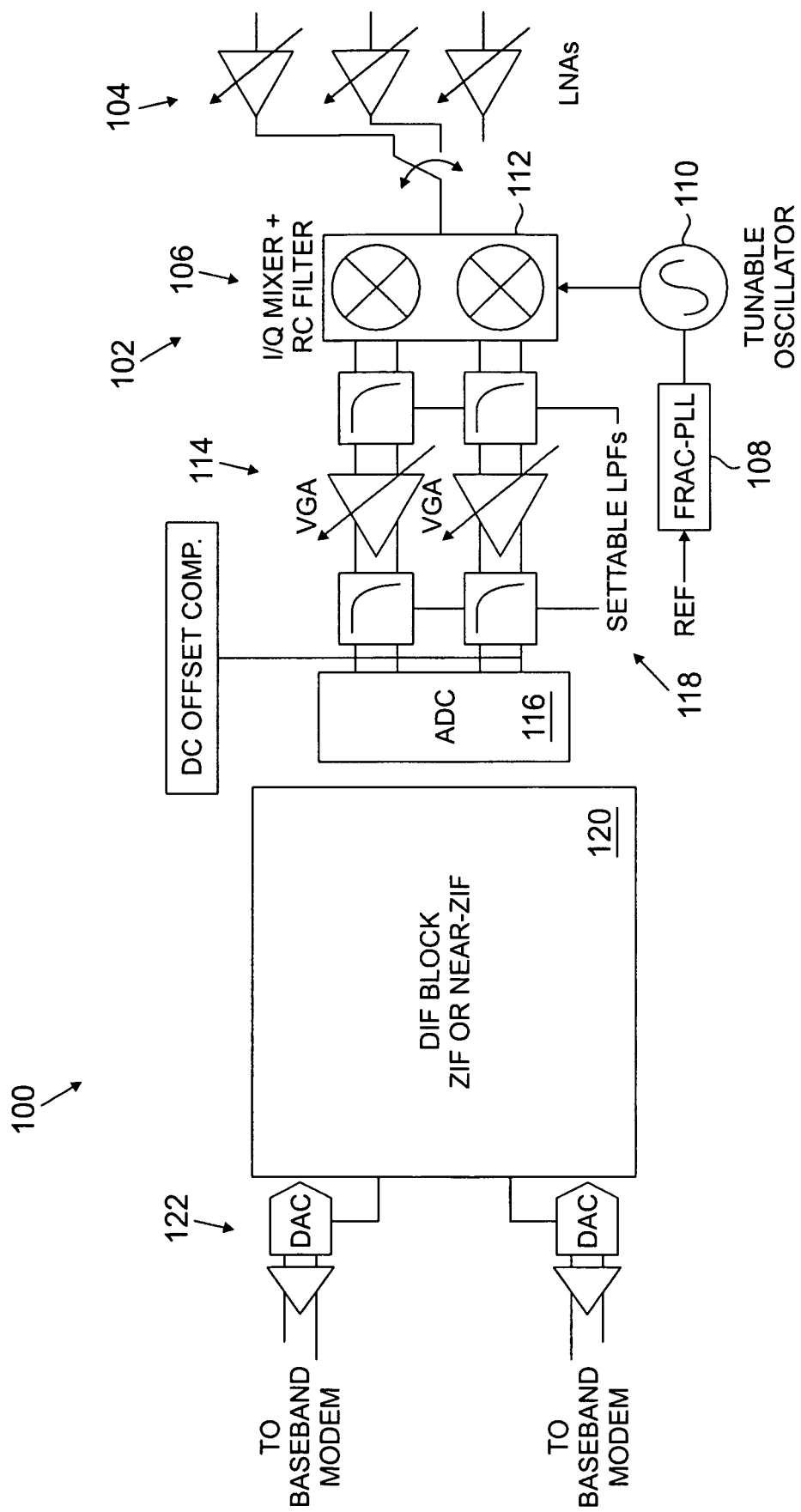
FIG. 1 illustrates one embodiment of wireless communications receiver system in accordance with the present disclosure.
Figure 2:
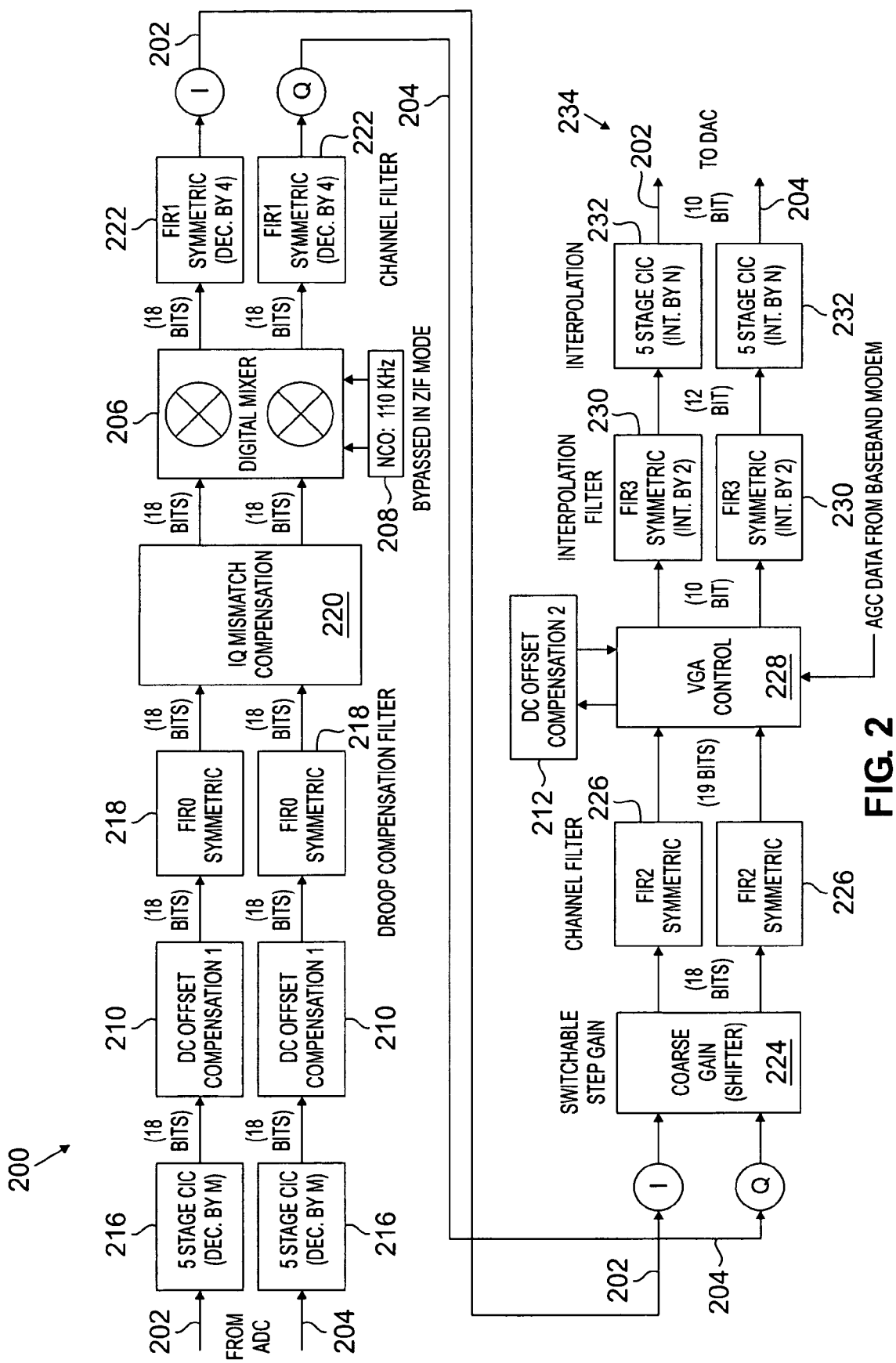
FIG. 2 illustrates an embodiment of a multi-mode signal processing segment in accordance with the present disclosure.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged receiver structure, whether such structure relies upon ZIF, NZIF or some other desired operational protocols.

The following discloses a versatile system, comprising various architectures, apparatus and methods for providing a single multimode receiver—whether as a stand-alone receiver, or as part of a transceiver device. This multimode architecture efficiently supports both wideband and narrow band operational modes—especially where such operations are based upon ZIF and NZIF protocols.

The system of the present disclosure provides a reconfigurable digital IF (DIF) construct, implemented within a multi-mode receiver. The DIF construct provides—regardless of whether a ZIF or NZIF based operational mode is active—an optimal receiver down conversion for efficient signal processing. Utilizing the DIF construct of the present disclosure, a single, common-core receiver performs equivalent to multiple, dedicated receivers, with no compromise in signal processing quality. The architecture of the present disclosure provides for optimization of performance for various modes and, at the same time, reduces the volume of receiver processing functions needed to realize such optimization. This invention thus provides a single common core receiver that functions as effectively, and more efficiently, than multiple receiver multi-mode systems—with no compromise in signal processing quality. This greatly reduces system costs and inefficiencies while improving operational reliability.

The system of the present disclosure provides a mobile terminal receiver architecture that can be conveniently reconfigured by software to perform either a direct down conversion—commonly preferred for wide band systems and referred to as ZIF—or a near-ZIF (NZIF) down conversion, having certain advantages for narrow band systems. The system of the present disclosure recognizes that the selection of a one down conversion technique over another is based upon a wide variety of factors—particularly any receiver test specifications required by an applicable standard.

According to the present disclosure, and as illustrated now in reference to FIG. 1, a multimode receiver component 100 comprises an analog RF front-end segment 102, having a low noise amplifier segment 104 and a down-conversion segment 106. In order for segment 106 to successfully accommodate two or more different down-conversion schemes, a local oscillator (LO) for down-converter segment 106 needs to be highly versatile and adaptable.

In response, the system of the present disclosure provides a programmable synthesizer component 108 (e.g., a phase-locked loop (PLL) based device, either fractional or integer based) in conjunction with a widely tunable oscillator element 110. Element 110 then feeds a mixer/demodulation element 112. Element 112 may be somewhat more complex than a comparable function in conventional single mode system, however, the present system recognizes that since the difference in ZIF and NZIF operation is usually relatively small (e.g., about 100 kHz~200 kHz), this is not an inhibiting design challenge for such an element.

The rest of analog segment 102 comprises an analog variable gain amplifier (VGA) block 114, and an analog-to-digital converter (ADC) block 116 to digitize signals being processed. Programmable low-pass filters 118 (LPFs) are implemented at the output portion of both the down converter block 106 and VGA block 114, to provide blocking and anti-aliasing functions. From these segments, signals pass to the DIF construct 120, which processes those signals in digital domain (as described hereinafter) before outputting the signals to a baseband modem (not shown) via digital to analog converter (DAC) elements 122.

Referring now to FIG. 2, one illustrative embodiment of a DIF construct 200 in accord with the present system is depicted. Construct 200 may be provided, for example, for multimode utilization with WCDMA ZIF and GSM/EDGE NZIF based systems. Construct 200 may be provided such that it uses the same data bus and width for both ZIF and NZIF modes. Depending upon the communication and processing technologies of a given application, construct 200 may comprise separate but parallel paths for processing different signal components. For example, in the embodiment depicted in FIG. 2, construct 200 illustratively comprises signal processing paths 202 and 204 for parallel processing of quadrature components (I) and (Q), respectively.

Construct 200 further comprises an IF to baseband digital mixer element 206. Mixer element 206 is utilized for NZIF operation, as driven by a numerically controlled oscillator (NCO) 208, and is bypassed or disabled for ZIF operation. Mixer 206 provides complex down-conversion necessary for image filtering when operating at NZIF frequency.

A DC offset correction element 210 is also provided. DC offset correction 210 is utilized in NZIF operation but may not be needed at an IF frequency of 170 kHz or above. ZIF operation will utilize a DC residual correction element 212—provided at some point after processing by FIR filters 218, 222 and 226.

As signals are introduced to construct 200 via inputs 214, a signal may first be processed by a first filtering element 216, prior to any offset compensation performed by element 210. As depicted in FIG. 2, filtering element 216 comprises a cascaded integrator-comb (CIC) type of filter. The specific topology and magnitude of element 216 may be varied to match design requirements of a given application. As depicted in FIG. 2, element 216 comprises a 5-stage CIC filter. Filter 216 has a programmable decimation rate (M) that may be provided or determined based on the incoming ADC rate.

From element 216, signal proceeds through offset compensation 210, and may then be filtered again by second filtering element 218 before proceeding to a mismatch compensation element 220. As depicted in FIG. 2, element 218 comprises a symmetric finite impulse response (FIR) type filter, providing droop compensation of prior analog LPFs 118 or CIC filter 216. After compensation by element 218, signal proceeds through mismatch compensation 200 to mixer element 206. After processing by element 206, signal may then proceed through a channel filtering element 222 before processing by a gain adjust element 224. As depicted in FIG. 2, element 222 comprises a symmetric FIR type filter.

Element 224 provides a coarse gain adjustment (i.e., switchable step gain), from which signal may then proceed through another channel filtering element 226, before proceeding to variable gain amplification (VGA) element 228. As depicted in FIG. 2, element 226 also comprises a symmetric FIR type filter. Once signal has been processed through VGA element 228, it may then proceed through one or more forms of interpolation filter elements 230, 232, before being output 234 from construct 200. As depicted in FIG. 2, element 230 comprises a symmetric FIR type interpolation filter, while element 232 comprises a 5-stage CIC interpolation component. Element 232 has a programmable interpolation rate (N) that may be determined or provided based upon the rate of a DAC to which signals are output 234.

VGA element 228 may be provided to maintain some nominal signal level into a baseband modem from output 234. Digital channel filtering elements 222 and 226 may be provided in a programmable format or configuration—enabling those elements to be reconfigurable or optimizable for signals in different modes with various bandwidths. The FIR filters of those elements may be designed to attenuate close-in blockers—including adjacent channel interferers, in GSM/EDGE, as well as any up-converted residual DC spurious noise from use of an NCO. These filters may also be designed or configured to perform amplitude equalization on frequency responses from, for example, analog low pass filters at the output of down-converter and VGA 228 output—to address any amplitude droop effect on a signal from being at a non-zero IF frequency.

In most embodiments, both ZIF and NZIF configurations are provided without any image rejection filtering. As such, image rejection is of particular concern in NZIF operation. For example, a minimum of about 35 dB of image rejection may be required when operating in GSM/EDGE mode, with an NZIF configuration. Given certain tolerances in I/Q mismatch, complex filtering in the digital domain is a preferable approach, and more deterministic in image reduction, which would otherwise be very challenging to provide in the analog domain.

Given the versatility of the present system, a number of application-specific or general-purpose adaptations may be readily implemented. For example, a receiver synthesizer may be exploited to adopt an NZIF configuration at greater than 110 kHz for GSM/EDGE—providing room for the FIR filters of construct 200 to block out any upcoverted DC spurs that may occur at 110 kHz, since baseband require signal bandwidth for EDGE processing may be greater than 100 kHz. In some instances, it may be possible that analog filter bandwidth may be constrained by amplitude droop or group delay effects on a signal, while at the same time maintaining selectivity. Advantageously, NZIF arrangement of construct 200 is not required to perform any digital DC correction if the IF is high enough (e.g., 170 kHz or above)—since any upcoverted residual DC component may be sufficiently filtered out, and digital functional blocks can be conceptualized as being perfectly linear.

Another advantage of an NZIF arrangement of the present invention is that—in a narrowband system like GSM/EDGE—a high-pass transfer function of an analog DC correction loop will induce little to no degradation of a signal, especially if an IF of greater than 135 kHz is used. This provides more accurate corrections with the receiver fully turned on and the dynamics of high signals and blockers, allowing for IM2 product reduction during active burst for better AM suppression. In certain ZIF operation instance, such as a broadband system like WCDMA, any high-pass effect on a signal is relatively insignificant. Primarily, a wider overall bandwidth, in conjunction with specifications that require close-in blockers that can become challenging to reduce using analog filters with high cut-off corners, prohibit WCDMA from operating in an NZIF mode.

It should now be easily appreciated by one of skill in the art that the system of the present disclosure provides and comprehends a wide array of variations and combinations easily adapted to a number of multi-mode, ZIF/NZIF applications. The relative arrangement and orientations of certain filtering or compensation elements may be provided in any manner suitable for a particular application. All such variations and modifications are hereby comprehended. It should also be appreciated that the system of the present disclosure may be readily implemented in any desired design or fabrication processes. The constituent members or components of this system may be produced or provided using any suitable hardware, software, or combination of hardware and software.

The embodiments and examples set forth herein are therefore presented to best explain the present invention and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A wireless communications device, supporting both zero intermediate frequency (ZIF) and near-zero intermediate frequency (NZIF) operation, the device comprising:

a down-conversion segment;
a local oscillator segment operatively associated with the down-conversion segment;
an analog-to-digital conversion (ADC) segment adapted to receive signals from the down-conversion segment;
a reconfigurable digital intermediate frequency construct adapted to receive digital signals from the ADC segment, the reconfigurable digital intermediate frequency construct comprising:
an analog DC offset compensation element,
a digital mixer element,
a channel filtering element,
a digital DC offset compensation element, and
a variable gain amplification element; and
a digital to analog segment adapted to receive digital signals from the digital intermediate frequency construct.

2. The device of claim 1, wherein the wireless communications device supports Wideband Code Division Multiple Access (WCDMA) operation mode.

3. The device of claim 1, wherein the wireless communications device supports Global System for Mobile communications (GSM) operation mode.

4. The device of claim 1, wherein the wireless communications device supports both Wideband Code Division Multiple Access (WCDMA) and Global System for Mobile communications (GSM) operation modes.

5. The device of claim 1, wherein the down conversion segment comprises a demodulation element having the local oscillator segment operatively associated therewith.

6. The device of claim 1, wherein the local oscillator segment comprises:
a tunable oscillator element coupled to the down conversion segment; and
a programmable synthesizer component coupled to the tunable oscillator element.

7. The device of claim 1, wherein the digital mixer element is driven by an oscillator element.

8. The device of claim 1, wherein the digital mixer element is bypassed or disabled during ZIF operation.

9. A method of processing both zero intermediate frequency (ZIF) and near-zero intermediate frequency (NZIF) operation within a single receiver, the method comprising the steps of:
down-converting received signals into a digital form;
performing an analog DC offset compensation on NZIF-based signals;
performing droop or mismatch compensation on the received signals;
performing image rejection on NZIF-based signals;
performing digital DC offset compensation on ZIF-based signals;
performing amplification of compensated signals to some nominal or desired level;
performing interpolation filtering of amplified signals prior to transmission thereof.

10. The method of claim 9, wherein the step of down-converting received signals comprises:
providing a down-conversion demodulation element;
providing a local oscillator segment operatively associated with the demodulation element; and
controlling the demodulation element using the local oscillator element.

11. The method of claim 10 wherein the step of controlling the demodulation element further comprises:
controlling the demodulation element using a tunable oscillator element; and
controlling the tunable oscillator element using a programmable synthesizer component coupled thereto.

12. The method of claim 9 wherein the step of performing image rejection on NZIF-based signals comprises performing such image rejection on an element that is bypassed or disabled during ZIF operation.

13. The method of claim 9, further comprising the step of decimation filtering signals after down-converting into digital form.

14. The method of claim 9, further comprising the step of channel filtering signals before performing amplification.

15. A multi-mode wireless communications receiver system comprising:
a low noise amplification segment;
a down-converter segment receiving signals from the low noise amplification segment;
a local oscillator segment driving the down-converter segment;
a first variable gain amplification segment receiving signals from the down-converter segment;
an analog-to-digital conversion segment adapted to receive signals from the first variable gain amplification segment;
a decimation filtering element receiving signals from the analog-to-digital conversion segment;
a first DC offset compensation element receiving signals from the decimation filtering element;
a bypassable image rejection element receiving signals from the first DC offset compensation element;
a channel filtering element receiving signals from the bypassable image rejection element;
a second DC offset compensation element receiving signals from the channel filtering element;
a second variable gain amplification segment receiving signals from the second DC offset compensation element; and
an interpolation segment receiving signals from the second variable gain amplification segment.

16. The system of claim 15, wherein the image rejection element is bypassed during a zero intermediate frequency (ZIF) operation, and active during a near-zero intermediate frequency (NZIF) operation.

17. The system of claim 15, wherein the first DC offset compensation element is utilized only for a near-zero intermediate frequency (NZIF) operation.

18. The system of claim 15, wherein the second DC offset compensation element is utilized only for a zero intermediate frequency (ZIF) operation.

19. The system of claim 15, wherein the local oscillator segment comprises a phase locked loop based device coupled to a widely tunable oscillator.

* * * * *